United States Patent
Yoon

(10) Patent No.: US 10,224,567 B2
(45) Date of Patent: Mar. 5, 2019

(54) BATTERY HAVING ELECTROLYTE INCLUDING MULTIPLE PASSIVATION LAYER FORMING COMPONENTS

(71) Applicant: Quallion LLC, Sylmar, CA (US)

(72) Inventor: Sang Young Yoon, Brea, CA (US)

(73) Assignee: Quallion LLC, Sylmar, CA (US)

( * ) Notice: Subject to any disclaimer, the term of this patent is extended or adjusted under 35 U.S.C. 154(b) by 736 days.

(21) Appl. No.: 13/987,925

(22) Filed: Sep. 16, 2013

(65) Prior Publication Data

US 2015/0079466 A1 Mar. 19, 2015

Related U.S. Application Data

(63) Continuation of application No. 11/891,522, filed on Aug. 10, 2007, now Pat. No. 8,535,834, which is a continuation-in-part of application No. 11/395,614, filed on Mar. 30, 2006, now abandoned, and a continuation-in-part of application No. 11/290,708, filed on Nov. 30, 2005, now abandoned, and a continuation-in-part of application No. 11/053,338, filed on Feb. 8, 2005, now Pat. No. 7,771,496, and a continuation-in-part of application No. 11/142,696, filed on May 31, 2005, now abandoned, and a continuation-in-part of application No. 11/284,861, filed on Nov. 22, 2005, now Pat. No. 9,466,837, and a continuation-in-part of application No. 11/056,869, filed on Feb. 10, 2005, now Pat. No. 8,076,032, and a continuation-in-part of application No. 10/971,912,
(Continued)

(51) Int. Cl.
*H01M 10/0567* (2010.01)
*H01M 10/0525* (2010.01)
*H01M 10/42* (2006.01)

(52) U.S. Cl.
CPC ... *H01M 10/0567* (2013.01); *H01M 10/0525* (2013.01); *H01M 10/4235* (2013.01); *Y02E 60/122* (2013.01)

(58) Field of Classification Search
CPC ......... H01M 10/0567; H01M 10/0525; H01M 10/4235
See application file for complete search history.

(56) References Cited

U.S. PATENT DOCUMENTS 7,026,074 B2 * 4/2006 Chen .................. H01M 10/052
429/326
7,172,834 B1 * 2/2007 Jow .................. H01M 10/0525
252/519.2

* cited by examiner

*Primary Examiner* — Karie O'Neill Apicella
(74) *Attorney, Agent, or Firm* — Gavrilovich, Dodd & Lindsey, LLP

(57) ABSTRACT

The battery includes an electrolyte activating a positive electrode and a negative electrode. The electrolyte includes a plurality of salts in a solvent, one or more passivation salts in the solvent, and one or more passivation additives in the solvent. At least one of the passivation salts forms a passivation layer on the negative electrode during discharge of the battery and includes both lithium and boron. At least one of the salts is an inorganic lithium salt that excludes boron. The solvent includes one or more organic solvents. At least one of the passivation additives forms a passivation layer on the negative electrode during discharge of the battery and is not a salt. The positive electrode has one or more positive active materials that each include a lithium transition-metal oxide and the negative electrodes includes a negative active material selected from a group consisting of lithium metal and graphite.

19 Claims, 1 Drawing Sheet

Related U.S. Application Data filed on Oct. 21, 2004, now Pat. No. 7,718,321, and a continuation-in-part of application No. 11/072,739, filed on Mar. 3, 2005, now Pat. No. 7,598,003, application No. 11/891,522, filed on Aug. 10, 2007, which is a continuation-in-part of application No. 11/165,406, filed on Jun. 22, 2005, now Pat. No. 8,153,307, and a continuation-in-part of application No. 11/175,879, filed on Jul. 5, 2005, now abandoned, said application No. 11/056,869 is a continuation-in-part of application No. 10/962,125, filed on Oct. 7, 2004, now abandoned, said application No. 10/971,912 is a continuation-in-part of application No. 10/962,125, said application No. 11/072,739 is a continuation-in-part of application No. 10/962,125, said application No. 11/165,406 is a continuation-in-part of application No. 10/962,125, said application No. 11/175,879 is a continuation-in-part of application No. 10/962,125.

(60) Provisional application No. 60/563,850, filed on Apr. 19, 2004, provisional application No. 60/563,848, filed on Apr. 19, 2004, provisional application No. 60/872,746, filed on Dec. 4, 2006.

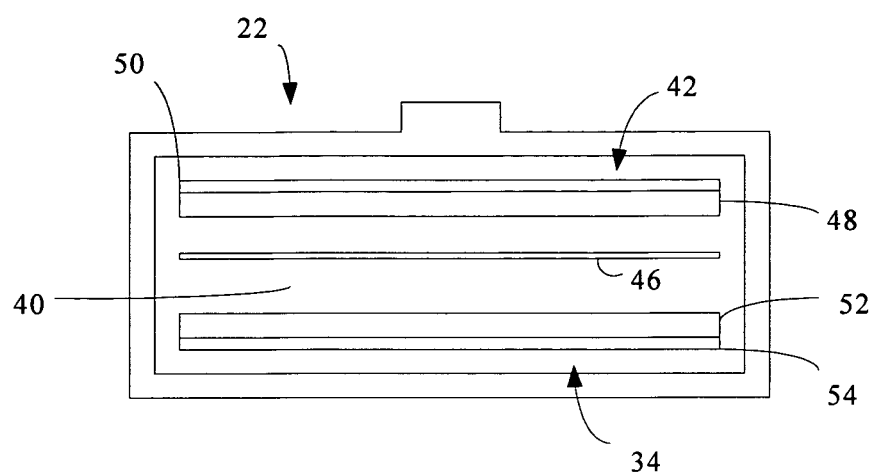

BATTERY HAVING ELECTROLYTE INCLUDING MULTIPLE PASSIVATION LAYER FORMING COMPONENTS

REFERENCE TO RELATED APPLICATIONS

This application is a continuation of U.S. patent application Ser. No. 11/891,522, filed on Aug. 10, 2007, entitled "Battery Having Electrolyte Including Multiple Passivation Layer Forming Components;" and U.S. patent application Ser. No. 11/891,522 is a continuation-in-part of U.S. patent application Ser. No. 11/395,614, filed on Mar. 30, 2006, entitled "Battery Having Cathode with Secondary Active Material for Providing Zero Volt Capabilities," now abandoned; and U.S. patent application Ser. No. 11/891,522 is a continuation-in-part of U.S. patent application Ser. No. 11/290,708, filed on Nov. 30, 2005, entitled "Battery Having Cathode Including Carbon Fiber," now abandoned; and U.S. patent application Ser. No. 11/891,522 is a continuation-in-part of U.S. patent application Ser. No. 11/053,338, filed on Feb. 8, 2005, entitled "Reduction of Impurities in Battery Electrolyte," now issued as U.S. Pat. No. 7,771,496; and U.S. patent application Ser. No. 11/891,522 is a continuation-in-part of U.S. patent application Ser. No. 11/142,696, filed on May 31, 2005, entitled "Battery Having A Solid Electrolyte," now abandoned; and U.S. patent application Ser. No. 11/891,522 is a continuation-in-part of U.S. patent application Ser. No. 11/284,861, filed on Nov. 22, 2005, entitled "Battery Having Negative Electrode Including Amorphous Carbon;" and U.S. patent application Ser. No. 11/891,522 is a continuation-in-part of U.S. patent application Ser. No. 11/056,869, filed on Feb. 10, 2005, entitled "Electrolyte Including Silane for use in Electrochemical Devices," now issued as U.S. Pat. No. 8,076,032; and U.S. patent application Ser. No. 11/891,522 is a continuation-in-part of U.S. patent application Ser. No. 10/971,912, filed on Aug. 4, 2005, entitled "Battery Having Electrolyte Including Organoborate Salt," now issued as U.S. Pat. No. 7,718,321; and U.S. patent application Ser. No. 11/891,522 is a continuation-in-part of U.S. patent application Ser. No. 11/072,739, filed on Mar. 3, 2005, entitled "Battery Having Enhanced Energy Density," now issued as U.S. Pat. No. 7,598,003; and U.S. patent application Ser. No. 11/891,522 is a continuation-in-part of U.S. patent application Ser. No. 11/165,406, filed on Jun. 22, 2005, entitled "Battery Including Electrolyte with Mixed Solvent", now issued as U.S. Pat. No. 8,153,307; and U.S. patent application Ser. No. 11/891,522 is a continuation-in-part of U.S. patent application Ser. No. 11/175,879, filed on Jul. 5, 2005, entitled "Battery Having Negative Electrode Including Amorphous Carbon," now abandoned; and U.S. patent application Ser. No. 11/891,522 claims the benefit of U.S. Provisional Patent Application Ser. No. 60/872,746, filed on Dec. 4, 2006, entitled "Battery Having Cathode with Coated Active Material and Carbon Fibers;" and U.S. patent application Ser. No. 11/891,522 claims the benefit of U.S. Provisional Patent Application Ser. No. 60/563,848, filed on Apr. 19, 2004, entitled "Composition Check For Organoborate Salt Employed In Electrochemical Device Electrolytes;" and U.S. patent application Ser. No. 11/891,522 claims the benefit of U.S. Provisional of U.S. Patent Application Ser. No. 60/563,850, filed on Apr. 19, 2004, entitled "Organoborate Salt In Electrochemical Device Electrolytes;" and patent application Ser. Nos. 11/056,869, 10/971,912, 11/072,739, 11/165,406, and 11/175,879 are each a continuation-in-part of U.S. patent application Ser. No. 10/962,125, filed on Oct. 7, 2004, entitled "Battery Having Electrolyte Including One or More Additives," now abandoned; each of the above patents and patent applications is incorporated herein in its entirety.

STATEMENT REGARDING FEDERALLY SPONSORED RESEARCH OR DEVELOPMENT

This invention was made with United States Government support under contract W15P7-05-C-P212 awarded by the U.S. Army Communications-Electronic Research & Engineering Center. The United States Government has certain rights in this invention.

FIELD

The present invention relates to electrochemical devices, and more particularly to electrochemical devices having electrolytes that include additives.

BACKGROUND

A variety of batteries make use of a positive electrode having a positive active material that includes a transition metal such as manganese. These batteries include a negative electrode that typically includes graphite as the negative active material. These batteries are often employed in high current applications such as powering movement of hybrid-electric vehicles, electric vehicles, and power tools. Placing a high current draw on these batteries can cause the temperature of these batteries to increase. Additionally, these batteries can be used in high temperature environments such as the desert. These increased temperatures are often associated with dissolution of manganese ions into the electrolyte. The ions can then migrate to the negative electrode where they deposit onto the negative electrode. The deposition of these ions on the negative electrode degrades the performance of the battery. As a result, there is a need for a battery having improved performance at high temperature and/or high current conditions.

SUMMARY

A battery includes an electrolyte activating a positive electrode and a negative electrode. The electrolyte includes a plurality of salts in a solvent, one or more passivation salts in the solvent, and one or more passivation additives in the solvent. At least one of the passivation salts forms a passivation layer on the negative electrode during charge of the battery and includes both lithium and boron. At least one of the salts is an inorganic lithium salt that excludes boron. The solvent includes one or more organic solvents. At least one of the passivation additives forms a passivation layer on the negative electrode during discharge of the battery and is not a salt. The positive electrode has one or more positive active materials that each include a lithium transition-metal oxide and the negative electrodes includes a negative active material selected from a group consisting of lithium metal and graphite.

An embodiment of the battery includes an electrolyte activating a positive electrode and a negative electrode. The electrolyte includes a plurality of salts in a solvent, one or more passivation salts in the solvent, and one or more passivation additives in the solvent. At least one of the passivation salts is selected from a group consisting of lithium bis(oxalato)borate (LiBOB) and lithium difluoro oxalato borate (LiDfOB). At least one of the salts is an inorganic lithium salt that excludes boron. The solvent includes one or more organic solvents and excludes polysiloxanes and silanes. At least one of the passivation additives is selected from a group consisting of vinyl carbonate (VC) and ethylene carbonate (VEC). The positive electrode has one or more positive active materials that each includes manganese and the negative electrode includes graphite as a negative active material.

BRIEF DESCRIPTION OF THE FIGURES

FIG. 1 is a schematic view of a battery.

DESCRIPTION

The battery includes an electrolyte activating one or more positive electrodes that include manganese and one or more negative electrodes that include graphite. The electrolyte includes one or more passivation additives, one or more passivation salts, and one or more salts in a solvent. The one or more passivation salts and the one or more form a passivation layer on the negative electrode during charge of the battery. Additionally, the one or more passivation additives form a passivation layer on the negative electrode during the discharge of the battery. Without being bound to theory, it is believed that passivation layer that results from the combination of the passivation additive and the passivation salt is more stable than the passivation layer that results from either the passivation additives or the passivation salts alone. A stabilized passivation layer can suppress the deposition of manganese ions on the negative electrode and can accordingly enhance the performance of the battery. For instance, a stabilized passivation layer can enhance cycling performance and reduce self-discharge.

FIG. 1 is a schematic view of a suitable battery 22. The battery 22 includes an electrolyte 40 activating a positive electrode 42 and a negative electrode 44. A separator 46 separates the positive electrode 42 and negative electrode 44. The positive electrode 42 includes a positive medium 48 on a positive substrate 50. The negative electrode 44 includes a negative medium 52 on a negative substrate 54. Although the battery is illustrated as including one negative electrode and one positive electrode, the battery can include more than one negative electrode and/or more than one positive electrode with the negative electrodes and positive electrodes each separated by a separator. Additionally, the battery can have a variety of different configurations such as stacked configuration, a "jellyroll" or wound configurations. In some instances, the battery is hermetically sealed. Hermetic sealing can reduce entry of impurities into the battery. As a result, hermetic sealing can reduce active material degradation reactions due to impurities. The reduction in impurity induced lithium consumption can stabilize battery capacity.

Suitable positive substrates 50 include, but are not limited to, aluminum, stainless steel, titanium, or nickel substrates. An example of a positive substrate that can enhance conductivity is a carbon coated aluminum current collector. The carbon coating may be applied using any suitable process known in the art, such as by coating a paste made of carbon and a binder. The thickness of the carbon coating can be less than 15 microns, less than 10 microns, about 3 microns or less, and less than 2 microns.

The positive medium 48 includes or consists of one or more positive active materials. Suitable positive active materials include, but are not limited to, lithium transition metal oxides such as $Li_xVO_y$, $LiCoO_2$, $LiNiO_2$, $LiNi_{1-x}Co_yMe_zO_2$, $LiMn_{0.5}Ni_{0.5}O_2$, $LiMn_{(1/3)}Co_{(1/3)}Ni_{(1/3)}$ $O_2$, $LiFePO_4$, $LiMn_2O_4$, $LiFeO_2$, $LiMc_{0.5}Mn_{1.5}O_4$, $LiMn_{1.5}McO_4$ and mixtures thereof wherein Me is Al, Mg, Ti, B, Ga, Si, Mn, Zn, Mo, Nb, V and Ag and combinations thereof, and wherein Mc is a divalent metal such as Ni, Co, Fe, Cr, Cu, and combinations thereof. In some instances, 0<x<1 before initial charge of the battery and/or 0<y<1 before initial charge of the battery and/or x' is ≥0 before initial charge of the battery and/or 1−x'+y'+z'=1 before initial charge of the battery. In some instances, the positive active materials exclude positive active materials other than lithium transition metal oxides. In some instances, the lithium transition metal oxides are more than 90 wt % of the weight of the one or more positive active materials. In addition to the one or more lithium transition metal oxides or as an alternative to the one or more lithium transition metal oxide, the positive active material can include vanadium oxide and/or carbon fluoride.

The positive active material preferably includes lithium and manganese. For instance, the positive active material preferably includes or consists of a lithium transition metal oxide that includes manganese. Examples of positive active materials that include lithium and manganese include, but are not limited to, $LiNi_{1-x}Co_yMe_zO_2$, $LiMn_{0.5}Ni_{0.5}O_2$, $LiMn_{(1/3)}Co_{(1/3)}Ni_{(1/3)}O_2$, $LiMn_2O_4$, $LiMc_{0.5}Mn_{1.5}O_4$, $LiMn_{1.5}McO_4$ and mixtures thereof wherein Me represents Mn or Me represents Mn and one or more components selected from Al, Mg, Ti, B, Ga, Si, Zn, Mo, Nb, V and Ag, and wherein Mc represents a divalent metal such as Ni, Co, Fe, Cr, Cu, and combinations thereof. In some instances, x' is ≥0 before initial charge of the battery and/or 1−x'+y'+z'=1 before initial charge of the battery.

The positive medium 48 can optionally include binders, conductors and/or diluents such as PVDF, graphite and acetylene black in addition to the one or more positive active materials. Suitable binders include, but are not limited to, PVdF, powdered fluoropolymer, powdered polytetrafluoroethylene or powdered polyvinylidene fluoride. Suitable conductors and/or diluents include, but are not limited to, acetylene black, carbon black and/or graphite or metallic powders such as powdered nickel, aluminum, titanium and stainless steel. In some instances, the binders, conductors and/or diluents are present at less than 15 wt % to about 8 wt % of the total positive medium weight.

A suitable material for the negative substrate 54 includes, but is not limited to, lithium metal, titanium, a titanium alloy, stainless steel, nickel, copper, tungsten, tantalum or alloys thereof.

The negative medium 52 includes or consists of one or more negative active materials and a binder. The one or more negative active materials can include or consist of carbonaceous materials that include or consist of carbon. For instance, the negative active material can include or consist of one, two, three or four components selected from the group consisting of: graphite, carbon beads, carbon fibers, and graphite flakes. The one or more negative active materials preferably include or consist of graphite. In some instances, the one or more negative active materials exclude active materials other than carbonaceous materials or other than graphite. In some instances, the carbonaceous materials are more than 90 wt %, 93 wt %, or 96 wt % of the weight of the one or more negative active materials or graphite is more than 70 wt %, 80 wt %, or 90 wt % of the weight of the one or more negative active materials. Examples of a negative electrode constructed having a carbonaceous mixture are provided in U.S. patent application Ser. No. 10/264,870, filed on Oct. 3, 2002, entitled "Negative Electrode for a Nonaqueous Battery," and incorporated herein in its entirety, which claims priority to U.S. Provisional Patent Application Ser. No. 60/406,846, filed on Aug. 29, 2002, and entitled "Negative Electrode for a Nonaqueous Battery," and incorporated herein in its entirety.

The negative active material can include a metal selected from Groups IA, IIA and IIIB of the Periodic Table of the Elements. Examples of these negative active materials include lithium, sodium, potassium and their alloys and intermetallic compounds. Examples of suitable alloys include, but are not limited to, Li—Si, Li—Al, Li—B, Li—Si—B. Another example of a suitable lithium alloy is a lithium-aluminum alloy. Examples of suitable intermetallic compounds include, but are not limited to, intermetallic compounds that include or consist of two or more components selected from the group consisting of Li, Ti, Cu, Sb, Mn, Al, Si, Pb, Sn, In, Bi, Ag, Ba, Ca, Hg, Pd, Pt, Te, Zn and La. Example of internmetallic compounds include $Cu_6Sn_5$, $Cu_2Sb$, MnSb. Other suitable negative active materials include lithium titanium oxides such as $Li_4Ti_5O_{12}$, and silica alloys and mixtures of the above negative active materials.

Suitable binders for use with the negative medium include, but are not limited to, PVdF, carboxymethyl cellulose (CMC), and styrene butadiene rubber (SBR). When the negative active material includes a carbonaceous mixture, the binder of the negative medium can exclude fluorine, and can include carboxymethyl cellulose (CMC). In some instances, styrene butadiene rubber (SBR) is added to impart elasticity to the mixture. In some instances, the one or more binders are present at less than 10 wt % to about 4 wt % of the total negative medium weight.

In some instances, the negative electrode consists of the negative medium. Accordingly, the negative medium also serves as the negative substrate. For instance, the negative medium and the negative substrate can consist of lithium metal or graphite. It is believed that the advantages provided by the combination of passivation salt and the passivation additive can also be achieved when lithium metal is employed as an active material in the negative electrode.

Suitable separators 46 include, but are not limited to, polyolefins such as polyethylene. Illustrative separator materials also include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene/polyethylene membrane commercially available under the designation CELGARD (Celanese Plastic Company, Inc.), a membrane commercially available under the designation DEXIGLAS (C.H. Dexter, Div., Dexter Corp.), and a polyethylene membrane commercially available from Tonen Chemical Corp.

The electrolyte includes one or more passivation additives, one or more passivation salts, and one or more salts in a solvent. The solvent preferably includes or consists of one or more organic solvents. Examples of suitable organic solvents include, but are not limited to, cyclic carbonates such as propylene carbonate (PC), ethylene carbonate (EC), butylene carbonate (BC), linear carbonates such as dimethyl carbonate (DMC), diethyl carbonate (DEC), ethylmethyl carbonate (EMC) and dipropyl carbonate (DPC), dialkyl carbonates such as diglyme, trigylme, tetragylme, 1,2-dimethoxyethane (DME), methyl propyl carbonate, ethyl propyl carbonate, esters like aliphatic carboxylate esters such as methyl formate, methyl acetate and ethyl propionate, gamma.-lactones such as .gamma.-butyrolactone, ethers including linear ethers such as 1,2-ethoxyethane (DEE) and ethoxymethoxyethane (EME), cyclic ethers such as tetrahydrofuran and 2-methyltetrahydrofuran, and aprotic organic solvents such as dimethylsulfoxide, 1,3-dioxolane, formamide, acetoamide, dimethylformamide, dioxolane, acetonitrile, propylnitrile, nitromethane, ethylmonoglyme, triester phosphate, timethoxymethane, dioxolane-derivatives, sulphorane, methylsulphorane, 1,3-diemthyl-2-imidazoline, 3-methyl-2-oxazolidinone, propylene carbonate-derivatives, tetrahydrofuran-derivatives, ethylether, 1,3-propanesultone, anisole, N-methylpyrrolidone and fluorinated carboxylate esters. The solvent can also include or consist of amides, polyalkylene oxides, polycarbonates, polyesters, polyamides and combinations thereof.

In some instances, the solvent includes silane solvents and/or siloxane solvents in addition to the organic solvents. When the solvent includes one or more organic solvents and one or more siloxane or silane solvents, a suitable volume ratio of the total organic solvents to the total siloxane and silane is greater than 1:99, 1:9, or 3:7 and/or less than 9:1, 4:1 or 7:3.

Examples of suitable siloxanes include polysiloxanes, tetrasiloxanes, trisiloxanes, disiloxanes and combinations thereof. Examples of suitable polysiloxane electrolytes are disclosed in U.S. patent application Ser. No. 10/810,019, filed on Mar. 25, 2004, entitled "Polysiloxane for Use in Electrochemical Cells," and incorporated herein in its entirety. Examples of suitable tetrasiloxane and tetrasiloxane electrolytes are disclosed in U.S. Provisional Patent Application Ser. No. 60/543,951, filed on Feb. 11, 2004, entitled "Siloxanes;" and in U.S. patent application Ser. No. 10/971,926, filed on Oct. 21, 2004, and entitled "Electrochemical Device Having Electrolyte Including Tetrasiloxane;" and in U.S. patent application Ser. No. 11/056,868, filed on Feb. 10, 2005, and entitled "Electrochemical Device Having Electrolyte Including Tetrasiloxane;" each of which is incorporated herein in its entirety. Examples of suitable trisiloxanes and trisiloxane electrolytes are disclosed in U.S. Provisional Patent Application Ser. No. 60/543,951, filed on Feb. 11, 2004, entitled "Siloxanes;" and U.S. Provisional Patent Application Ser. No. 60/542,017, filed on Feb. 4, 2004, entitled "Nonaqueous Electrolyte Solvents for Electrochemical Devices;" and U.S. Provisional Patent Application Ser. No. 60/543,898, filed on Feb. 11, 2004, entitled "Siloxane Based Electrolytes for Use in Electrochemical Devices;" and in U.S. patent application Ser. No. 10/971,913, filed on Oct. 21, 2004, and entitled "Electrochemical Device Having Electrolyte Including Trisiloxane;" and in U.S. patent application Ser. No. 11/056,867, filed on Feb. 10, 2005, and entitled "Electrochemical Device Having Electrolyte Including Trisiloxane;" each of which is incorporated herein in its entirety. Examples of suitable disiloxanes and disiloxane electrolytes are disclosed in U.S. Provisional Patent Application Ser. No. 60/543,951, filed on Feb. 11, 2004, entitled "Siloxanes;" and U.S. Provisional Patent Application Ser. No. 60/542,017, filed on Feb. 4, 2004, entitled "Nonaqueous Electrolyte Solvents for Electrochemical Devices;" and U.S. Provisional Patent Application Ser. No. 60/543,898, filed on Feb. 11, 2004, entitled "Siloxane Based Electrolytes for Use in Electrochemical Devices," and in U.S. patent application Ser. No. 10/971,507, filed on Oct. 21, 2004, and entitled "Electrochemical Device Having Electrolyte Including Disiloxane;" and in U.S. patent application Ser. No. 11/056,869, filed on Feb. 10, 2005, and entitled "Electrochemical Device Having Electrolyte Including Disiloxane;" each of which is incorporated herein in its entirety. Examples of suitable silanes and silane electrolytes are disclosed in U.S. Provisional Patent Application Ser. No. 60/601,452, filed on Aug. 13, 2004, entitled "Electrolyte Including Silane for Use in Electrochemical Devices;" and in U.S. patent application Ser. No. 10/977,313, filed on Oct. 28, 2004, and entitled "Electrolyte Including Silane for Use in Electrochemical Device;" and in U.S. patent application Ser. No. 11/056,869, filed on Feb. 10, 2005, and entitled "Electrolyte Including Silane for Use in Electrochemical Device;" each of which is incorporated herein in its entirety.

Suitable salts for use with the electrolyte include alkali metal salts that that exclude boron. In some instances, the alkali metal salts are inorganic salts that exclude boron. Suitable alkali metal salts include lithium salts. Examples of lithium salts include $LiClO_4$, $LiAsF_6$, $LiPF_6$, $LiSbF_6$, $LiCF_3SO_3$, $LiC_6F_5SO_3$, $LiC(CF_3SO_2)_3$, $LiN(SO_2C_2F_5)_2$, $LiN(SO_2CF_3)_2$ (LiTFSI), $LiAlCl_4$, $LiGaCl_4$, LiSCN, $LiO_2$, $LiO_3SCF_3$, $LiO_2CCF_3$, $LiSO_6F$, Li-methide, Li-imide, lithium alkyl fluorophosphates and combinations thereof. The electrolyte can be prepared such that the total concentration of the one or more salts in the electrolytes is about 0.3 to 2.0 M, about 0.5 to 1.5 M, or about 0.7 to 1.5 M.

The passivation salts are salts that form a passivation layer on one or more negative electrodes in the battery during discharge of the battery. Suitable passivation salts include inorganic salts that include boron or that include lithium and boron such as $LiBF_4$ and LiDfOB. Preferred passivation salts are organic salts that include boron. In some instances, the organic salts include both boron and lithium. Examples of suitable organic salts that include boron include organoborate salts or lithium organoborate salts. Organoborate salts include aromatic lithium bis[bidentate] borates, also known as a bis[chelato] borate, such as bis[benzenediolato (2-)-O,O'] borate, bis[substituted benzenediolato (2-)-O,O'] borate, bis[salicylato] borate, bis[substituted salicylato] borate, bis[2,2'-biphenyldiolato (O,O')] borate, and bis[substituted 2,2'-biphenyldiolato (O,O')] borate]. In some instances, the organoborate salt is a nonaromatic bis[chelato] borate, such as bis[oxalato (2-)-O,O'] borate, bis[malonato (2-)-O,O'] borate, bis[succinato] borate, [.alpha.-hydroxy-carboxylato] borate, [.alpha.-hydroxy-carboxylato] borate, [.beta.-hydroxy-carboxylato] borate, [.beta.-hydroxy-carboxylato] borate, [.alpha.-dicarboxylato] borate, and [.alpha.-dicarboxylato] borate. In some instances, the organoborate salt is a mono[bidentate] borate, a tridentate borate, or a tetradentate borate. Examples of suitable organoborate salt include lithium bis(tetrafluoroethylenediolato)borate $LiB(OCF_2CF_2O)_2$, lithium bis(hexafluoropropylenediolato)borate $LiB[OCF(CF_3)CF_2O]_2$ and lithium bis[1,2-tetrakis(trifluoromethyl)ethylenedialato (2-)O,O-']borate or lithium bis(perfluoropinacolato)borate $LiB[OC(CF_3)_2C(CF_3)_2O]_2$ or $LiB[OC(CF_3)_2]_4$. Preferred lithium organoborate salts are lithium bis-oxalato borate (LiBOB), and lithium difluoro oxalato borate (LiDfOB).

Examples of suitable organoborate salts are disclosed in U.S. Patent Application Ser. No. 60/565,211, filed on Apr. 22, 2004, entitled "Organoborate Salt in Electrochemical Device Electrolytes" and incorporated herein in its entirety.

One example of the lithium organoborate salt includes: a boron linked directly to at least two oxygens and an organic moiety linking two of the oxygens. In some instances, the boron is also linked directly to two halogens. Another example of the lithium organoborate salt includes: a boron linked directly to each of four oxygens; a first organic moiety linking two of the oxygens; and a second organic moiety linking the other two oxygens. The first organic moiety and the second organic moiety can be the same or different. The first organic moiety and/or the second organic moiety can be: substituted or unsubstituted; and/or branched or unbranched; and/or saturated or unsaturated. The backbone of an organic moiety extending between the boron linked oxygens can include only carbons or can include carbons and one or more oxygens. In some instances, one or both of the organic moieties are halogenated. In one example, the first organic moiety and/or the second organic moiety is fluorinated.

An example of the organoborate salt is represented by the following Formula I-A:

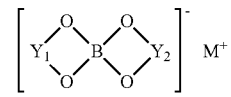

wherein $M^+$ is a metal ion selected from the Group I or Group II elements and can be lithium; $Y_1$ and $Y_2$ are each selected from the group consisting of —$CX(CR_2)_aCX$—, —$CZZ'(CR_2)_aCZZ'$—, —$CX(CR_2)_aCZZ'$—, —$SO_2(CR_2)_bSO_2$—, and —$CO(CR_2)_bSO_2$—; X is =O or =NR', Z is alkyl, halogenated alkyl, —C=NR', $CR'_3$ or R'; Z' is alkyl, halogenated alkyl, —C=NR', $CR'_3$ or R'; R' is halogen or hydrogen; R is hydrogen, alkyl, halogenated alkyl, cyano, or halogen; a is 0 to 4 and b is 1 to 4. $M^+$ is preferably selected from Group I and is most preferably lithium. $Y_1$ and $Y_2$ can be the same or different. Z and Z' can be the same or different. The R' can be the same or different and the R can be the same or different.

In an example of an organoborate salt according to Formula I-A, $Y_1$ and $Y_2$ are each —$CX(CR_2)_aCX$—; each X is =O and each R is hydrogen. In another example of the organoborate salt, $Y_1$ and $Y_2$ are each —$CX(CR_2)_aCX$—; each X is =O and each R is a halogen. In another example of the organoborate salt, $Y_1$ and $Y_2$ are each —$CX(CR_2)_aCX$—; each X is =O and each R is fluoro.

In a preferred example of an organoborate salt according to Formula I-A, $Y_1$ and $Y_2$ are each —$CZZ'(CR_2)_aCZZ'$—; each of the R' is hydrogen and each of the R are hydrogen. In another preferred example, $Y_1$ and $Y_2$ are each —$CZZ'(CR_2)_aCZZ'$—; each of the R' is halogen and each of the R are halogens. In another preferred example, $Y_1$ and $Y_2$ are each —$CZZ'(CR_2)_aCZZ'$—; each of the R' is fluorine and each of the R are fluorine.

Another example of the organoborate salt is represented by the following Formula I-B:

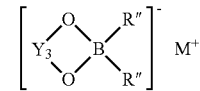

wherein $M^+$ is a metal ion selected from the Group I or Group II elements and can be lithium; $Y_3$ is selected from the group consisting of —$CX(CR_2)_aCX$—, —$CZZ'(CR_2)_aCZZ'$—, —$CX(CR_2)_aCZZ'$—, —$SO_2(CR_2)_bSO_2$—, and —$CO(CR_2)_bSO_2$—; X is =O or =NR', Z is alkyl, halogenated alkyl, —C=NR', $CR'_3$ or R'; Z' is alkyl, halogenated alkyl, —C=NR', $CR'_3$ or R'; R" is a halogen; R' is halogen or hydrogen; R is hydrogen, alkyl, halogenated alkyl, cyano, or halogen; a is 0 to 4 and b is 1 to 4. $M^+$ is preferably selected from Group I and is most preferably lithium. Z and Z' can be the same or different. The R" can be the same or different. The R' can be the same or different. The R can be the same or different.

In an example of an organoborate salt according to Formula I-B, $Y_3$ is —CX(CR$_2$)$_a$CX—; each X is =O and each R" is a halogen. In another example of the organoborate salt, $Y_3$ is —CX(CR$_2$)$_a$CX— and each R" is a fluorine.

The one or more passivation additives form a passivation layer on one or more negative electrodes in the battery during discharge of the battery. The additives can be reduced and/or polymerize at the surface of the negative electrode to form the passivation layer. Vinyl carbonate (VC) and vinyl ethylene carbonate (VEC) are example of additives that can form a passivation layer by being reduced and polymerizing to form a passivation layer. The result of the reduction is $Li_2CO_3$ and butadienne that polymerises when it sees an electron at the negative electrode surface. Ethylene sulfite (ES) and propylene sulfite (PS) form passivation layers by mechanisms that are similar to VC. In some instances, one or more of the additives has a reduction potential that exceeds the reduction potential of the components in the solvent. For instance, VEC and VC have a reduction potential of about 2.3V. This arrangement of reduction potentials can encourage the additive to form the passivation layer before reduction of other electrolyte components and can accordingly reduce consumption of other electrolyte components.

In some instances, suitable passivation additives exclude salts and are liquids or solids when standing alone at room temperature. Examples include unsaturated carbonates. For instance, suitable passivation additives include substituted or unsubstitited carbonates having one or more saturations in the carbonate ring. Vinyl carbonate (VC) is an example of a suitable unsubstituted cylic carbonate having an unsaturation in the ring. Other examples of suitable unsaturated carbonates include substituented cyclic alkylene carbonates having one or more unsaturations in the ring and/or in the substituents. Examples of cyclic carbonates having unsaturated substituents include vinyl ethylene carbonate (VEC), and o-phenylene carbonate (CC, $C_7H_4O_3$), and alkylene carbonates substituted with one or more alkenyl groups and/or one or more alkenylene groups. Other examples of suitable unsaturated carbonates include linear carbonates linear carbonates having one or more unsaturated substituents such as ethyl 2-propenyl ethyl carbonate ($C_2H_5CO_3C_3H_5$). The above carbonates can be fully or partially halogenated. In some instances, the substituents on the above carbonates include only alkyl or alkenyl substituents that are themselves unsubstituted, fully halogenated, or partially halogenated.

In some instances, the passivation additive can be an acetates having one or more unsaturated substituents such as vinyl acetate (VA). In some instances, other suitable additives include cyclic alkyl sulfites and linear sulfites. For instance, suitable additives may include unsubstituted cyclic alkyl sulfites such as ethylene sulfite (ES); substituted cyclic alkylene sulfites such as ethylene sulfite substituted with an alkyl group such as a methyl group (propylene sulfite, PS); linear sulfites having one or more one more alkyl substituents and dialkyl sulfites such as dimethyl sulfite (DMS) and diethyl sulfite (DES). Other suitable additives include halogenated-gamma-butyrolactones such as bromo-gamma-butyrolactone (BrGBL) and fluoro-gamma-butyrolactone (FGBL).

The one or more passivation salts and the one or more passivation additives can be selected so at least one of the passivation salts has a decomposition voltage that is higher than the decomposition voltage of at least one of the passivation additives. In some instances, the one or more passivation salts and the one or more passivation additives are selected so each of the passivation salts has a decomposition voltage that is higher than the decomposition voltage of at least one of the passivation additives. For instance, VC has a decomposition voltage around 1 V while LiBOB has a decomposition voltage around 1.8 V.

The total weight of the passivation salt plus the passivation additive can be less than 5 wt %, less than 1 wt %, or less than 0.5 wt % of the total electrolyte weight. Additionally, the weight ratio of the total weight of the salts (excluding the passivation salts) to the total weight of the passivation salt can be less than 10:1, less than 100:1, or less than 500:1. The total weight of the passivation salt can be less than 5 wt %, less than 1 wt %, or less than 0.5 wt % of the total electrolyte weight.

The electrolyte can be a liquid. In some instances, the electrolyte is a solid or a gel. For instance, the electrolyte can include a network polymer that interacts with the solvent to form an interpenetrating network. The interpenetrating network can serve as a mechanism for providing a solid electrolyte or gel electrolyte. Alternately, the electrolyte can include one or more solid polymers that are each a solid at room temperature when standing alone. The solid polymer can be employed in conjunction with the solvent to generate an electrolyte such as a plasticized electrolyte as a solid or as a gel. Alternately, one or more silanes and/or one or more siloxanes in the solvent can be cross linked to provide a solid or gel electrolyte. A polysiloxane is an example of a crosslinkable solvent. Suitable examples for method of forming a cross linked polymer are disclosed in U.S. patent application Ser. No. 10/810,019, filed on Mar. 25, 2004, entitled "Polysiloxane for Use in Electrochemical Cells" and incorporated herein in its entirety.

EXAMPLE 1

First negative electrodes were prepared by mixing Mesocarbon Microbeads (Osaka gas Co., Ltd., MCMB 25-28) and graphite fiber in the form of carbon fiber (Petoca Co., Ltd., GMCF) with a solution of 2 wt % of carboxymethyl cellose (CMC) in water (Dai-ichi Kogyo Seiyaku Co., Ltd., Celogen WSC) and a solution of 40% of styrene butadiene rubber (SBR) in water (Dai-ichi Kogyo Seiyaku Co., Ltd., BM-400). The result had a 7:3 weight ratio of Mesocarbon Microbeads: graphite fiber. The result was coated to a 10 um thickness of copper foil and dried in an oven preset at 80° C.

First positive electrodes were prepared by mixing $LiNi_{0.33}Co_{0.33}Mn_{0.33}O_2$ (Mitsubishi Chemicals., Ltd., NMC-05-6) with a solution having 12 wt % PVdF in n-methylpyrolidone (NMP) (Kureha Co., Ltd., PVdF1120), and acetylene black. The mixture was coated on 15 μm thick aluminum foil substrate and dried in an oven preset at 120° C. and pressed. Cathodes were cut from the result with dimensions of about 24.3 mm×361.0 mm.

Second positive electrodes were prepared by mixing spinel lithium manganese oxide (LiMn2O4, Toda Co., Ltd., LM16), a solution having a 12 wt %-solution of PVdF in n-methyl pyrolidone (NMP) (Kureha Co., Ltd., PVdF7208), and Super P (Timcal Co., Ltd., Super P).

A first electrolyte was prepared by dissolving $LiPF_6$ to 1.3 M in solvent having a mixture of ethylene carbonate (EC), propylene carbonate (PC), ethyl methyl carbonate (EMC) and diethyl carbonate (DEC) at a respective weight ratio of 30/5/55/10.

A second electrolyte was prepared by adding of vinylene carbonate to the first electrolyte at 2 wt %.

A third electrolyte+LiDfOB) was prepared by adding LiDfOB salt to the first electrolyte at 0.3 wt %.

A fourth electrolyte was prepared by adding LiBF4 to the second electrolyte at 0.3 wt %.

A fifth electrolyte was prepared by adding LiBOB to the second electrolyte at 0.3 wt %.

A sixth electrolyte was prepared by was prepared by adding LiDfOB to the second electrolyte at 0.3 wt %.

First cells were prepared using the negative electrode in combination with the negative electrode, the first positive electrode, one of the electrolytes, and a Tonen separator. Second cells were also prepared using the negative electrode in combination with the negative electrode, the second positive electrode, one of the electrolytes, and a Celgard separator.

The first cells and the second cells were tested for capacity retention during cycling between 3.0 V and 4.2 V in a 55° C. oven. During cycling, the cells were charged at 1 C and discharged at 1 C. The second cells were tested for self-discharge performance by checking capacity after storage of the fully charged cells in a 55° C. oven for one week. The results of the testing are illustrated in Table 1. The cells having a combination of passivation salt and passivation additive showed better cycling performance and better self discharge performance.

|  | First positive electrode | Second positive electrode | |
|---|---|---|---|
|  | Capacity retention (%) after 250 cycles at 55° C. | Capacity retention (%) after 50 cycles at 55° C. | Retained capacity (%) after storage at 50° C. for 1 week |
| First electrolyte | 60 | 48 | 52 |
| Second electrolyte | 85 | 53 | 62 |
| Third electrolyte | 88 | 77 | 75 |
| Fourth electrolyte | 90 | 79 | 87 |
| Fifth electrolyte | 91 | 80 | 87 |
| Sixth electrolyte | 93 | 81 | 89 |

Although the battery is disclosed in the context of a secondary battery, the above principles can be applied to a primary battery. As a result, the positive electrode described above can refer to a cathode in a primary battery and/or the negative electrode described above can refer to an anode in a primary battery. Additionally, the above electrode and electrolyte combinations can be employed in other electrochemical devices such as capacitors and hybrid capacitors/batteries.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:
1. A battery, comprising:
an electrolyte activating a positive electrode and a negative electrode,
the electrolyte including a plurality of salts in a solvent, one or more passivation salts in the solvent, and one or more passivation additives in the solvent,
at least one of the passivation salts forming a passivation layer on the negative electrode during discharge of the battery and including lithium and boron,
at least one of the passivation salts being an organoborate salt represented by Formula II:

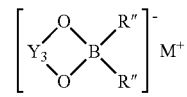

wherein $M^+$ is a metal ion selected from the Group I or Group II elements; $Y_3$ is selected from a group consisting of —$CX(CR_2)_aCX$—, —$CZZ'(CR_2)_a CZZ'$—, —$CX(CR_2)_aCZZ'$—, —$SO_2(CR_2)_bSO_2$—, and —$CO(CR_2)_bSO_2$—; X is =O or =NR', Z is alkyl, halogenated alkyl, —C=NR', $CR'_3$, or R'; Z' is alkyl, halogenated alkyl, —C=NR', $CR'_3$ or R'; R" is a halogen; R' is halogen or hydrogen; R is hydrogen, alkyl, halogenated alkyl, cyano, or halogen; a is 0 to 4 and b is 1 to 4,
at least one of the salts being an inorganic lithium salt that excludes boron,
the solvent including one or more organic solvents,
at least one of the passivation additives forming a passivation layer on the negative electrode during discharge of the battery and not being a salt,
the positive electrode has one or more positive active materials that each include a lithium transition-metal oxide, and
the negative electrode includes a negative active material selected from a group consisting of lithium metal and graphite.

2. The battery of claim 1, wherein the lithium transition-metal oxide includes manganese.

3. The battery of claim 1, wherein the electrolyte is a nonaqueous electrolyte.

4. The battery of claim 1, wherein at least one of the passivation salts is a lithium organoborate.

5. The battery of claim 1, wherein at least one of the passivation salts is less than 1 wt % of the electrolyte.

6. The battery of claim 1, wherein the one or more passivation additives are less than 10 wt % of the electrolyte.

7. The battery of claim 1, wherein a total weight of the passivation salts plus the passivation additives is less than 1 wt % of the total electrolyte weight.

8. The battery of claim 1, at least one of the passivation additives is selected from a group consisting of vinyl carbonate (VC), vinyl ethylene carbonate (VEC), ethylene sulfite (ES), propylene sulfite (PS), 1,3 dimethyl butadiene, styrene carbonate, phenyl ethylene carbonate (PhEC), an aromatic carbonate, vinyl pyrrole, vinyl piperazine, vinyl piperidine, and vinyl pyridine.

9. The battery of claim 1, wherein at least one of the passivation additives is an unsaturated carbonate.

10. The battery of claim 9, wherein the unsaturated carbonate is selected from a group consisting of vinyl carbonate (VC) and vinyl ethylene carbonate (VEC).

11. The battery of claim 1, wherein at least one of the passivation salts is represented by Formula I:

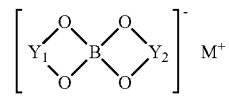

wherein M⁺ is a metal ion selected from the Group I or Group II elements; $Y_1$ and $Y_2$ are each selected from a group consisting of: —CX(CR$_2$)$_a$CX—, —CZZ'(CR$_2$)$_a$CZZ'—, —CX(CR$_2$)$_a$CZZ'—, —SO$_2$(CR$_2$)$_b$SO$_2$—, and —CO(CR$_2$)$_b$SO$_2$—; X is =O or =NR', Z is alkyl, halogenated alkyl, —C=NR', CR'$_3$ or R'; Z' is alkyl, halogenated alkyl, —C=NR', CR'$_3$ or R; R' is halogen or hydrogen; R is hydrogen, alkyl, halogenated alkyl, cyano, or halogen; a is 0 to 4 and b is 1 to 4.

12. The battery of claim 11, wherein Formula I represents lithium bis(oxalato)borate (LiBOB).

13. The battery of claim 1, wherein at least one of the passivation salts has a decomposition potential that is greater than a decomposition potential of at least one of the passivation additives.

14. A battery, comprising:
an electrolyte activating a positive electrode and a negative electrode,
the electrolyte including a plurality of salts in a solvent, one or more passivation salts in the solvent, and one or more passivation additives in the solvent,
at least one of the passivation salts being represented by Formula II:

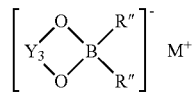

wherein M⁺ is a metal ion selected from the Group I or Group II elements; $Y_3$ is selected from a group consisting of —CX(CR$_2$)$_a$CX—, —CZZ'(CR$_2$)$_a$CZZ'—, —CX(CR$_2$)$_a$CZZ'—, —SO$_2$(CR$_2$)$_b$SO$_2$—, and —CO(CR$_2$)$_b$SO$_2$—; X is =O or =NR', Z is alkyl, halogenated alkyl, —C=NR', CR'$_3$, or R'; Z' is alkyl, halogenated alkyl, —C=NR', CR'$_3$ or R'; R" is a halogen; R' is halogen or hydrogen; R is hydrogen, alkyl, halogenated alkyl, cyano, or halogen; a is 0 to 4 and b is 1 to 4,
at least one of the salts is an inorganic lithium salt that excludes boron,
the solvent including one or more organic solvents and excluding polysiloxanes and silanes,
at least one of the passivation additives being selected from a group consisting of vinyl carbonate (VC) and vinyl ethylene carbonate (VEC),
the positive electrode has one or more positive active materials that each includes manganese, and
the negative electrode includes graphite as a negative active material.

15. The battery of claim 14, wherein Formula II represents (LiDfOB).

16. The battery of claim 14 wherein the passivation salt represented by Formula II forms a passivation layer on the negative electrode during discharge of the battery.

17. The battery of claim 1, wherein Formula II represents (LiDfOB).

18. The battery of claim 1, wherein the organoborate salt represented by Formula II forms the passivation layer on the negative electrode during discharge of the battery.

19. The battery of claim 14, wherein the organoborate salt represented by Formula II forms the passivation layer on the negative electrode during discharge of the battery.

* * * * *